United States Patent
Nakamoto

(10) Patent No.: US 7,387,016 B2
(45) Date of Patent: Jun. 17, 2008

(54) ATOMIC FORCE MICROSCOPE AND METHOD OF ENERGY DISSIPATION IMAGING USING THE SAME

(75) Inventor: Keiichi Nakamoto, Tokyo (JP)

(73) Assignee: JEOL Ltd., Tokyo (JP)

( * ) Notice: Subject to any disclaimer, the term of this patent is extended or adjusted under 35 U.S.C. 154(b) by 0 days.

(21) Appl. No.: 11/375,686

(22) Filed: Mar. 14, 2006

(65) Prior Publication Data

US 2006/0213260 A1 Sep. 28, 2006

(30) Foreign Application Priority Data

Mar. 14, 2005 (JP) .............................. 2005-070465
Dec. 2, 2005 (JP) .............................. 2005-348550

(51) Int. Cl.
*G01B 5/28* (2006.01)
(52) U.S. Cl. ...................................... 73/105
(58) Field of Classification Search .................... 73/105
See application file for complete search history.

(56) References Cited

U.S. PATENT DOCUMENTS

| | | | | | |
|---|---|---|---|---|---|
| 6,008,489 | A | * | 12/1999 | Elings et al. ............... | 250/234 |
| 6,038,916 | A | * | 3/2000 | Cleveland et al. ............ | 73/105 |
| 6,952,952 | B2 | * | 10/2005 | Hinterdorfer et al. ......... | 73/105 |
| 6,983,644 | B2 | * | 1/2006 | Yamanaka et al. ............ | 73/105 |
| 7,055,378 | B2 | * | 6/2006 | Su et al. ..................... | 73/105 |
| 2002/0092340 | A1 | * | 7/2002 | Prater et al. ................ | 73/24.02 |

FOREIGN PATENT DOCUMENTS

JP 2002-277378 9/2002

OTHER PUBLICATIONS

Kazushi Yamanaka and Shizuka Nakano, "Ultrasonic Atomic Force Microscope with Overtone Excitation of Cantilever", Jpn. J. Appl. Phys., vol. 35 (1996), pp. 3787-3792, Part 1, No. 6B, Jun. 1996.

Oliver B. Wright and Norihiko Nishiguchi, "Vibrational dynamics of force microscopy: Effect of tip dimensions", Appl. Phys. Lett. 71 (5), Aug. 4, 1997, pp. 626-628.

K. Yamanaka and S. Nakano, "Quantitative elasticity evaluation by contact resonance in an atomic force microscope", Appl. Phys. A 66, 1998, pp. S313-S317.

Kazushi Yamanaka et al., "Resonance frequency and Q factor mapping by ultrasonic atomic force microscopy", Applied Physics Letters, vol. 78, No. 13, Mar. 26, 2001, pp. 1939-1941.

* cited by examiner

*Primary Examiner*—Michael Cygan
(74) *Attorney, Agent, or Firm*—The Webb Law Firm

(57) ABSTRACT

An atomic force microscope and method of energy dissipation imaging using such atomic force microscope. The atomic force microscope has a cantilever equipped with a probe for making contact with a sample, a vibrating unit for vibrating the cantilever, a vibration control unit for controlling the vibrating unit based on a preset value of amplitude, a vibration detector for detecting the amplitude of the vibration of the cantilever, and an imaging unit for creating an energy dissipation image based on the vibration of the cantilever. Error information based on the difference between the value of amplitude detected by the amplitude detection unit and the preset value of amplitude is fed back to the vibrating unit. Thus, the vibrating unit vibrates the cantilever to drive it into resonance. The imaging unit creates an energy dissipation image based on the difference information.

6 Claims, 2 Drawing Sheets

ATOMIC FORCE MICROSCOPE AND METHOD OF ENERGY DISSIPATION IMAGING USING THE SAME

BACKGROUND OF THE DISCLOSURE

1. Field of the Invention

The present invention relates to an atomic force microscope (AFM) adapted to evaluate physical properties of a sample. The present invention also relates to a method of energy dissipation imaging using the AFM.

2. Description of Related Art

Ultrasonic atomic force microscopy (UAFM) has been developed as a technique for evaluating the contact resilience of the sample surface portion in contact with the probe of a cantilever from the resonance frequency of a flexural mode of the cantilever of an atomic force microscope (AFM) operating in contact mode. A sample-evaluating method using the UAFM has the feature that the contact resilience of a hard sample can be evaluated using a softer cantilever than the cantilever used in the contact resilience-evaluating technique using the force modulation mode. Therefore, the evaluation method using the UAFM is adapted for evaluation of metals, ceramics, and semiconductors (see, for example, K. Yamanaka and S. Nakano, Jpn. J. Appl. Phys. 35.93 (1996).

The energy dissipation characteristics of the portion of the sample surface which is in contact with the cantilever probe can be evaluated approximately from the Q factor defined as the ratio of the resonance peak width to the resonance frequency (see, for example, O. Wright and N. Nishiguchi, Appl. Phys. Lett. 71, 626 (1997).

Another method for evaluating the resilience characteristics more completely is also proposed, for example, in K. Yamanaka and S. Nakano, Appl. Phys. A, 66, S313 (1998). In this method, the Young's modulus, shear modulus, and Poisson's ratio are separated, using a torsional mode of a cantilever.

A further method of imaging the energy dissipation in the portion of a sample surface in contact with the cantilever probe is proposed. In this method, the imaging is performed by increasing the speed of scanning of the cantilever and mapping the Q factor at each pixel.

This ultrasonic atomic force microscope is similar to the non-contact atomic force microscopy (NC-AFM) using a frequency modulation mode, in that the resonance of the cantilever is used. However, there exists a fundamental difference. That is, in NC-AFM, the cantilever vibrates at large amplitudes exceeding 10 nm, so that the cantilever probe moves away from the sample. Meanwhile, in ultrasonic AFM, the cantilever vibrates at small amplitudes of less than 1 nm while the probe is kept in contact with the sample.

As a result, the force gradient that is the ratio of displacement to force or the contact resilience remains almost constant over one whole cycle of vibration. This produces the advantage that it is possible to realize accurate quantitative evaluation. Therefore, this technique is anticipated as a novel method of lattice defect analysis that compensates for the drawbacks with the techniques for evaluating electronic and mechanical materials in the fields of nanotechnology and electron microscopy.

The configuration of a conventional atomic force microscope is shown in FIG. 2, where a sample 21 is placed on a sample stage 4. A probe 20 is mounted at the tip of a cantilever 1 and located opposite to the sample 21.

Light from a laser diode (LD) 2 is directed at the cantilever 1. The reflected light is detected by a split photodiode (FD) 3 via a mirror 24. The output signal from the photodiode 3 is sent to a calculation portion 5, which produces a cantilever signal indicative of the flexure of the cantilever 1.

The cantilever signal from the calculation portion 5 is split into two parts. One of the parts is input into a z-motion controller 7 via a low-pass filter (LPF) 6. The z-motion controller 7 controls the z-position of the sample 21 placed on the sample stage 4.

The other part of the cantilever signal is input to a phase comparator 12 via a band-pass filter (BPF) 11. Furthermore, the output signal from an oscillator 8 is amplified by an amplifier 9 and then split into two parts and applied to the phase comparator 12 via a variable phase shifter 22. The output signal $V_p$ from the phase comparator 12 is applied to an error amplifier 13. Furthermore, a reference voltage signal Vref is also applied to the error amplifier 13, which in turn produces an output signal $V_E$ proportional to the difference between the two signals, or error. The output signal $V_E$ is applied to an adder 16 via a switch 14.

The output $V_o$ from a voltage source circuit 15 is also applied to the adder 16. The output V from the adder 16 is input into the oscillator 8. The output from the oscillator 8 is fed back to an ultrasonic oscillator 10 via the amplifier 9.

The output signal from the band-pass filter 11 is fed to an amplitude detector 17 and to a frequency demodulator 18. The output signals from the amplitude detector 17 and frequency demodulator 18 are applied to an imaging device 19. The imaging device 19 creates a Q factor image based on the output signal from the amplitude detector 17 and creates a resonant frequency image based on the output signal from the frequency demodulator 18.

To obtain an energy dissipation image, it is intrinsically necessary to visualize the excitation energy applied from the outside such that the amplitude of the cantilever is kept constant.

In the conventional technique, however, the cantilever is oscillated at a constant excitation voltage. The output obtained at this time from the amplitude detector 17 is directly fed to the imaging device 19. The imaging device 19 approximately creates an energy dissipation image directly based on the output from the amplitude detector 17. See K. Yamanaka et al., Appl. Phys. Lett. 78, 1939 (2001); Japanese Patent Laid-Open No. 2002-277378; and U.S. Pat. No. 6,983,644.

In the conventional technique, in a case where an energy dissipation image is obtained, the cantilever is vibrated at a constant excitation voltage. An energy dissipation image has been approximately created based on the output itself obtained at this time from the amplitude detector. In this conventional technique, it has been impossible to obtain an accurate energy dissipation image.

SUMMARY OF THE INVENTION

The present invention has been made in view of the foregoing problems. It is an object of the present invention to provide an atomic force microscope capable of obtaining an accurate energy dissipation image. It is another object of the present invention to provide a method of energy dissipation imaging using such an atomic force microscope.

An atomic force microscope according to an embodiment of the present invention has a cantilever equipped with a probe for making contact with a sample, vibrating means for vibrating the cantilever, vibration control means for controlling the vibrating means based on a set value of amplitude, amplitude detection means for detecting the amplitude of vibration of the cantilever, and imaging means for creating an energy dissipation image based on the vibration of the cantilever. Information (hereinafter may be referred to as the difference information) indicating the difference between the value of amplitude detected by the amplitude detection means and the set value of amplitude is fed back to the vibration means. Thus, the vibrating means vibrates the cantilever to drive it into resonance. The imaging means creates an energy dissipation image based on the difference information.

A method of energy dissipation imaging according to an embodiment of the present invention is implemented with an atomic force microscope having a cantilever equipped with a probe for making contact with a sample, vibrating means for vibrating the cantilever, vibration control means for controlling the vibrating means based on a set value of amplitude, amplitude detection means for detecting the amplitude of vibration of the cantilever, and imaging means for creating an energy dissipation image based on the vibration of the cantilever. The method of energy dissipation imaging starts with taking the difference between the value of amplitude detected by the amplitude detection means and the set value of amplitude. Information about this difference is fed back to the vibrating means. The vibrating means vibrates the cantilever to drive it into resonance. The imaging means creates an energy dissipation image based on the difference information.

In the present invention, the difference information about the difference between the value of amplitude detected by the amplitude detection means and the set value of amplitude is fed back to the vibrating means. Thus, the vibrating means vibrates the cantilever to drive it into resonance. The imaging means creates an energy dissipation image based on the difference information obtained at this time.

The difference information obtained at this time corresponds to the energy applied to the vibrating means to maintain constant the amplitude of the vibration of the cantilever in resonance. Therefore, the energy can be imaged. An accurate energy dissipation image can be obtained.

Other objects and features of the present invention will appear in the course of the description thereof, which follows.

DESCRIPTION OF THE PREFERRED EMBODIMENTS

The preferred embodiments of the present invention are hereinafter described with reference to the accompanying drawings.

Figure 1:
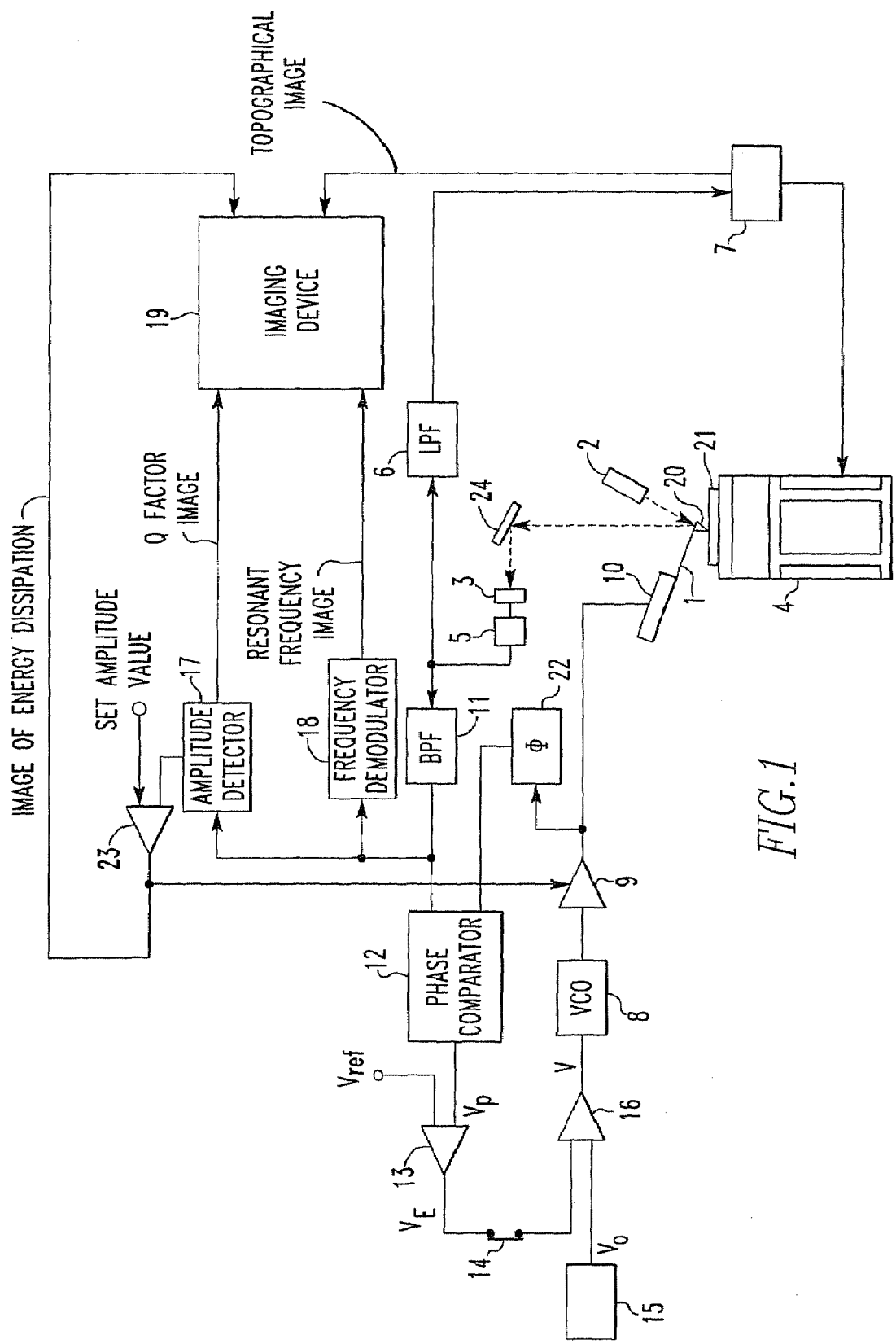
FIG. 1 is a diagram showing the configuration of an atomic force microscope according to one embodiment of the present invention.
Figure 2:
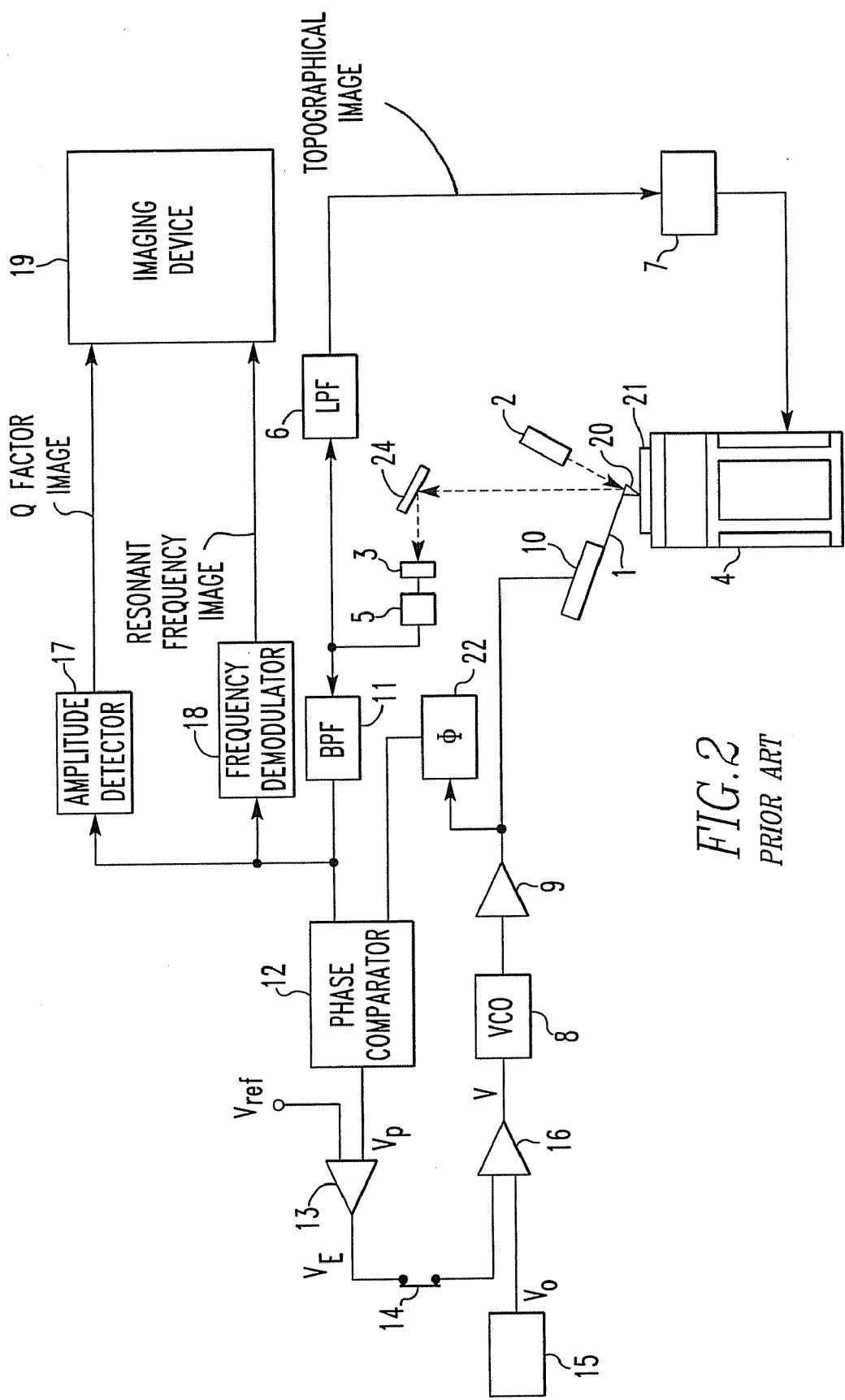
FIG. 2 is a diagram showing the configuration of a conventional atomic force microscope.

Referring to FIG. 1, the configuration of an atomic force microscope according to one embodiment of the present invention is shown. The microscope is equipped with a cantilever 1 having a probe 20 attached to its front end. A sample 21 is located opposite to the probe 20 and placed on a sample stage 4. This sample stage 4 consists of a piezo tube scanner capable of controlling the position of the sample along the x-, y-, and z-axes. The probe 20 is brought into contact with the sample 21.

There is also provided an optical system for directing light produced from a laser diode (LD) 2 at the cantilever 1. The reflected light is detected by a split photodiode (FD) 3 via a mirror 24. A cantilever signal indicative of the flexure of the cantilever 1 is obtained.

The cantilever signal which is proportional to the tilt angle caused by flexure of the cantilever 1 is produced from a calculation portion 5. The cantilever signal from the calculation portion 5 is split into two parts. One of the parts is input into a low-pass filter (LPF) 6. A z-motion controller 7 controls the z-position of the sample according to the signal from the filter 6.

The ultrasonic atomic force microscope built in accordance with one embodiment of the present invention and shown in FIG. 1 has an oscillator 8 and an amplifier 9 as components of this instrument. The amplifier 9 amplifies the AC signal produced by the oscillator 8. The output signal from the amplifier 9 is supplied to an ultrasonic oscillator 10 on a cantilever holding portion.

One of the two parts of the cantilever signal is supplied to the signal input terminal of a phase comparator 12 via a band-pass filter (BPF) 11. The output signal from the oscillator 8 is amplified by the amplifier 9 and then split into two parts. One of the two parts is supplied to the reference signal input terminal of the phase comparator 12 via a variable phase shifter 22.

The output signal $V_p$ from the phase comparator 12 is input to an error amplifier 13 together with a reference voltage signal Vref that can be preset by a control program. An output signal $V_E$ that is in proportion to the error of the output signal $V_p$ from the reference voltage signal Vref is applied to one input terminal of the adder 16 via a switch 14.

The output $V_o$ from a voltage supply circuit 15 that supplies a constant voltage is applied to the other input terminal of the adder 16. The constant voltage can be specified by the control program. The output V from the adder 16 is applied to the input terminal of the oscillator 8. The output from the oscillator 8 is fed back to the ultrasonic oscillator 10 via the amplifier 9, the oscillator 10 consisting of a piezoelectric device. Thus, the cantilever 1 is vibrated.

The output signal from the band-pass filter 11 is applied to an amplitude detector 17 and to a frequency demodulator 18. The output signal from the amplitude detector 17 and the output signal from the frequency demodulator 18 are applied to an imaging device 19.

The signal from the amplitude detector 17 is input to one input terminal of an automatic gain controller (AGC) 23 consisting of an error amplifier. A set amplitude value that can be preset arbitrarily by the control program is applied to the other input terminal of the AGC 23. The output signal from the AGC 23 is split into two parts one of which is applied to the imaging device 19. The other signal is fed back to the amplifier 9 to adjust the gain of the amplifier 9. The vibration voltage to the ultrasonic oscillator 10 is varied by the adjustment such that the cantilever 1 resonates at the set amplitude at all times.

In FIG. 1, the voltage-controlled oscillator 8, amplifier 9, ultrasonic oscillator 10, voltage supply circuit 15, and adder 16 together constitute a vibrating circuit. The phase comparator 12, variable phase shifter 22, error amplifier 13, AGC 23, and switch 14 together form a vibration control circuit. An external programmable filter having a steep cutoff characteristic of 48 dB/Oct can be connected with the band-pass filter 11 and used. The structures of the components of the atomic force microscope shown in FIG. 1 have been described so far. The operation of the instrument is next described.

When the sample 21 is at a distance from the probe 20, the operator adjusts the positions of the laser diode 2 and photodiode 3 as one operation of the AFM such that the cantilever signal indicative of flexure of the cantilever 1 is obtained at optimum sensitivity. Then, the z-motion controller 7 is operated.

The z-motion controller 7 elevates the sample stage 4 to bring the sample 21 into contact with the probe 20. This sets the control loop for the z-position of the sample 21 into operation to maintain the varying output cantilever signal at a preset constant value, the cantilever signal being produced through the low-pass filter (LPF) 6.

The set voltage $V_o$ is adjusted such that the oscillation frequency of the oscillator 8 agrees with the resonance frequency when the probe 20 is in contact with the sample and that the amplitude of the cantilever signal is maximized. After the end of the adjustment, the set voltage $V_o$ is kept at the adjusted value.

Under this condition, the variable phase shifter 22 is adjusted to adjust the amount of shift Ø of the variable phase of the oscillated output signal such that the output $V_p$ from the phase comparator 12 agrees with the reference voltage Vref. The output signal $V_E$ from the error amplifier 13 is set to zero. During the process steps described so far, the switch 14 for feedback control is opened.

After the end of the setting described above, the switch 14 for feedback control for the oscillator 8 is closed to operate the control loop for tracking the resonant frequency. At this instant, however, the oscillation frequency of the oscillator 8 does not vary because the output signal from the error amplifier 13 is zero.

The sample stage 4 is scanned in the x- and y-directions in two dimensions to start scanning of the sample 21. The probe 20 is scanned over the sample 21 whose physical property varies from location to location. During this scanning, the resonant frequency of the cantilever 1 is varied according to the physical property of the portion of the sample in contact with the probe 20. The phase of the output signal from the BPF 11 varies.

As a result, the output voltage $V_p$ from the phase comparator 12 varies. Consequently, an inverted output voltage $V_E$ is produced from the error amplifier 13. The output voltage $V_E$ is added to the set voltage $V_o$ by the adder 16. In consequence, negative feedback is applied to the adder 16. The sum output voltage is applied to the oscillator 8. The frequency of the oscillation output from the oscillator 8 varies in a direction to restore the resonant state of the cantilever 1. As a result of the operation for tracking the resonance frequency as described so far, the cantilever 1 vibrates at the resonant frequency while the cantilever is kept in contact with the sample 21 at all times. The variation described so far is automatically made as the operation of the circuit configuration described above.

Under this condition, the value of amplitude detected by the amplitude detector 17 and a preset value of the amplitude of the cantilever 1 are applied to the AGC 23. The difference between the two amplitudes is produced as an error signal (i.e., information about the difference) from the AGC 23. The error signal from the AGC 23 is applied to the imaging device 19.

The error signal from the AGC 23 corresponds to the amount of energy dissipation. In particular, the error signal is a voltage signal and indicates a physical amount corresponding to the amount of energy dissipation. This physical amount corresponds to the energy applied to the vibrating means to maintain constant the amplitude of the vibration of the cantilever 1 in resonance. Therefore, an image of energy dissipation based on the vibration of the cantilever 1 is precisely formed by visualizing the error signal by the imaging device 19. Consequently, energy dissipation at the contact portion between the sample 21 and the cantilever 1 can be mapped precisely.

The error signal produced from the AGC 23 at this time is split into two parts at this time and fed back as the gain of the amplifier 9 to the amplifier 9. The vibration voltage applied to the ultrasonic oscillator 10 is varied in such a way that the cantilever 1 is resonated at a preset amplitude at all times.

The amplitude detector 17 finds the root mean square (RMS) of the amplitude of the output signal from the band-pass filter (BPF) 11 to which the cantilever signal is applied and gains the height Vmax of the resonant peak. The signal Vmax is fed to the imaging device 19. The imaging device 19 converts the amplitude of the vibration of the cantilever 1 into a Q factor, using a calibration curve or sensitivity coefficient (described later).

Similarly, the frequency demodulator 18 detects the frequency of the output signal from the band-pass filter 11 and supplies the found resonant frequency signal to the imaging device 19. As the probe 20 is scanned over the sample, the imaging device 19 records the resonant frequency signal and the Q-factor signal in the image memory of the imaging means. Consequently, the imaging device 19 can gain a resonant frequency image and a Q-factor image and display them on the viewing screen of a display device (not shown).

To find the aforementioned calibration curve or sensitivity coefficient for converting Vmax into a Q factor, it is necessary to obtain a symmetrical resonant spectrum (i.e., a linear spectrum). For this purpose, the oscillator 8 is operated while the switch 14 for feedback for the oscillator 8 is opened, to measure the linear spectrum. This is performed by inspecting the symmetry of the resonant spectrum of the ultrasonic AFM. Thus, the cantilever 1 is excited in a flexural mode.

Furthermore, the input voltage $V_o$ determining the oscillation frequency of the oscillator 8 is swept. The resonant spectrum of the cantilever 1 is measured from the output from the band-pass filter 11. At this time, if the gain of the amplifier producing the oscillation output is too high, the amplitude of the cantilever will become too large. The probe 20 will intermittently move away from the sample 21, impairing the symmetry of the spectrum.

Accordingly, the gain of the amplifier 9 is adjusted such that the spectrum is symmetrical left and right with respect to the resonant frequency and that a sufficiently good signal-to-noise ratio is obtained. In this way, a linear resonant spectrum is derived from the cantilever 1 that is vibrating while the probe 20 and sample 21 are kept in contact with each other at all times. In addition, the peak frequency of the linear resonant spectrum and the half-value width are measured, and the Q factor is calculated. The height Vmax of the resonance peak at this time is recorded.

Combinations of different values of Q factor and Vmax are created by varying the load and the position of the probe 20 over the sample 21. Measurements are made under these combinations. This process is repeated plural times. In this way, a calibration curve quantitatively showing the relation between the Q factor and Vmax is created. Since a linear relationship holds between the Q factor and the height Vmax of the resonance peak, if the sensitivity coefficient Q/Vmax is found from a set of measurements, permissible approximate results will be obtained. Data about the calibration curve and sensitivity coefficient Q/Vmax found in this way is stored in the imaging device 19.

When the probe 20 is scanned over the sample (image scanning), if the surface of the sample 21 has unevenness, the output signal component of the cantilever signal passed through the low-pass filter 6 varies. The z-position of the sample 21 is controlled by the z-motion controller 7 such that the output signal component is returned to a constant value. A z-motion control signal for this purpose is supplied from the z-motion controller 7 to the imaging device 19. As the sample is scanned, the z-motion control signal is recorded in the image memory of the imaging device 19. Thus, a topographical image of the sample 21 is displayed on the viewing screen of the display device. The value of the load applied at this time is recorded. The value is used in an analysis in which the characteristics of the sample are evaluated from the resonant frequency and Q factor. The operation of the atomic force microscope according to an embodiment of the present invention has been described so far.

In the present invention, an accurate dissipation image can be obtained by providing an automatic gain control (AGC) circuit, measuring the energy necessary to maintain constant the amplitude of the cantilever, and visualizing the energy.

As described previously, an atomic force microscope according to one embodiment of the present invention has the cantilever 1 equipped with the probe 20 for making contact with the sample 21, the vibrating means for vibrating the cantilever 1, the vibration control means for controlling the vibrating means based on the set value of amplitude, the amplitude detector (amplitude detection means) 17 for detecting the amplitude of the vibration of the cantilever 1, and the imaging device 19 for creating an energy dissipation image based on the vibration of the cantilever 1. An error signal based on the difference between the value of amplitude detected by the amplitude detection means and the set value of amplitude is fed back to the vibrating means. The vibrating means vibrates the cantilever 1 to drive it into resonance. The imaging device 19 creates an energy dissipation image based on the error signal.

A method of energy dissipation imaging according to an embodiment of the present invention is implemented with an atomic force microscope having the cantilever 1 equipped with the probe 20 for making contact with the sample 21, the vibrating means for vibrating the cantilever 1, the vibration control means for controlling the vibrating means based on the set value of amplitude, the amplitude detector 17 for detecting the amplitude of the vibration of the cantilever 1, and the imaging device 19 for creating an energy dissipation image based on the vibration of the cantilever 1. An error signal based on the difference between the value detected by the amplitude detection means and the set value of amplitude is fed back to the vibrating means. Thus, the vibrating means vibrates the cantilever 1 to drive it into resonance. The imaging device 19 creates an energy dissipation image based on the error signal.

In one feature of the present invention, the vibrating means has the amplifier 9. The gain of the amplifier 9 is adjusted based on the fed-back error signal.

In another feature of the present invention, the vibration control means detects the phase of the amplitude of the vibration of the cantilever 1 and applies negative feedback to the vibrating means based on the detected amount of variation in the phase.

In this way, in the present invention, the error information based on the difference between the value of amplitude detected by the amplitude detection means and the set value of amplitude is fed back to the vibrating means. Thus, the vibrating means vibrates the cantilever 1 to drive it into resonance. The imaging device 19 creates an energy dissipation image based on the error information obtained at this time.

Since the error information obtained at this time corresponds to the energy applied to the vibrating means to maintain constant the amplitude of the vibration of the cantilever 1 in resonance, the energy can be visualized. An accurate energy dissipation image can be obtained.

Having thus described my invention with the detail and particularity required by the Patent Laws, what is desired protected by Letters Patent is set forth in the following claims.

The invention claimed is:

1. An atomic force microscope comprising:
    a cantilever equipped with a probe for scanning a sample and making contact with the sample at all times during scanning;
    vibrating means for vibrating the cantilever with an ac drive signal;
    amplitude detection means for detecting the amplitude of flexure tilt angle of the cantilever during vibration of the cantilever the probe of which is in contact with the sample;
    vibration control means for controlling the vibration means based on a set value of amplitude, the vibration control means including an automatic gain controller for producing an output signal based on the difference between a value of amplitude detected by the amplitude detection means and said set value of amplitude; and
    imaging means for creating an energy dissipation image of an energy applied to the vibrating means to maintain constant the amplitude of the vibration of the cantilever in resonance,
    wherein said output signal from the automatic gain controller is fed back to the vibrating means in order to cause the drive signal of the vibrating means to vibrate the cantilever into resonance at said set value of amplitude during the scanning by the probe which is in contact with the sample, and
    wherein said output signal from the automatic gain controller is applied to said imaging means and said imaging means creates the energy dissipation image based on said output signal.

2. An atomic force microscope as set forth in claim 1, wherein said vibrating means has an amplifier, and wherein the gain of the amplifier is adjusted based on said fed-back information indicating the difference.

3. An atomic force microscope as set forth in claim 1 or 2, wherein said vibration control means detects the phase of the vibration of the cantilever and applies negative feedback to said vibrating means based on the detected amount of variation in the phase.

4. A method of energy dissipation imaging adapted to be implemented with an atomic force microscope having a cantilever equipped with a probe for scanning a sample and for making contact with the sample at all times during the scanning, vibrating means for vibrating the cantilever with an ac drive signal, amplitude detection means for detecting the amplitude of the flexure tilt angle of the cantilever during vibration of the cantilever the probe of which is in contact with the sample, vibration control means for controlling the vibration means based on a set value of amplitude, the vibration control means including an automatic gain controller for producing an output signal based on the difference between a value of amplitude detected by the amplitude detection means and said set value of amplitude, and imaging means for creating an energy dissipation image of an energy applied to the vibrating means to maintain constant the amplitude of the vibration of the cantilever in resonance, said method of energy dissipation imaging comprising the steps of:

taking the difference between the value of amplitude detected by the amplitude detection means and said set value of amplitude by the automatic gain controller;

feeding an output signal from the automatic gain controller to said imaging means, and said difference back to the vibrating means in order to cause the drive signal of the vibrating means to vibrate the cantilever into resonance at a preset amplitude during scanning by the probe which is in contact with the sample; and causing said imaging means to create the energy dissipation image based on said output signal.

5. A method of energy dissipation imaging as set forth in claim 4, wherein said vibrating means equipped in the atomic force microscope has an amplifier, and wherein the gain of the amplifier is adjusted based on said fed-back information about the difference.

6. A method of energy dissipation imaging as set forth in claim 4 or 5, wherein said vibration control means equipped in the atomic force microscope detects the phase of the vibration of the cantilever and applies negative feedback to the vibrating means based on the detected amount of variation in the phase.

* * * * *